(12) United States Patent
Cai

(10) Patent No.: US 11,694,075 B2
(45) Date of Patent: Jul. 4, 2023

(54) PARTITIONING CONTROL DEPENDENCY EDGE IN COMPUTATION GRAPH

(71) Applicant: ALIBABA GROUP HOLDING LIMITED, Grand Cayman (KY)

(72) Inventor: Xinli Cai, San Mateo, CA (US)

(73) Assignee: Alibaba Group Holding Limited, Grand Cayman (KY)

(*) Notice: Subject to any disclaimer, the term of this patent is extended or adjusted under 35 U.S.C. 154(b) by 869 days.

(21) Appl. No.: 16/562,393

(22) Filed: Sep. 5, 2019

(65) Prior Publication Data

US 2021/0073625 A1 Mar. 11, 2021

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC .. G06N 3/02; G06N 3/08; G06N 3/04; G06N 3/063; G06F 30/27
USPC ........................................................ 706/12
See application file for complete search history.

(56) References Cited

U.S. PATENT DOCUMENTS

| | | | |
|---|---|---|---|
| 2002/0184504 A1* | 12/2002 | Hughes | H04L 9/3247 713/176 |
| 2013/0019008 A1* | 1/2013 | Jorgenson | H04L 41/12 709/224 |
| 2017/0124454 A1* | 5/2017 | Vasudevan | G06N 3/082 |
| 2017/0132513 A1* | 5/2017 | Yu | G06F 9/5044 |
| 2018/0204117 A1* | 7/2018 | Brevdo | G06N 3/0445 |
| 2020/0202246 A1* | 6/2020 | Lin | G06F 16/9024 |

* cited by examiner

*Primary Examiner* — Paul Dinh
(74) *Attorney, Agent, or Firm* — Finnegan, Henderson, Farabow, Garrett & Dunner, LLP

(57) ABSTRACT

The present disclosure relates to a method for adapting a computation graph of a machine learning model. The method comprises partitioning the computation graph at an edge between a first node and a second node, wherein the edge is a control dependency edge. The method further comprises inserting a proxy node, a send node, and a receive node between the first node and the second node. The proxy node is connected to the first node, the send node is configured to receive output data from the proxy node, and the receive node is configured to receive the output data from the send node.

12 Claims, 6 Drawing Sheets

500

300

410

420

430

PARTITIONING CONTROL DEPENDENCY EDGE IN COMPUTATION GRAPH

BACKGROUND

Machine learning has been widely applied to solve problems including image classification, speech recognition, etc. In machine learning, neural network models have been constantly increasing and becoming more complicated. Moreover, neural network models are also becoming more diversified in their behaviors. In fact, a typical neural network model may have thousands or even millions of nodes and is usually very large (hundreds of Mbytes).

Traditional homogeneous computing architectures generally cannot meet ever-growing needs for computing power and diversity corresponding to today's neural network models. Therefore, various types of heterogeneous computing devices or accelerators for machine learning or deep learning have been developed, and a neural network model may be partitioned and assigned onto multiple accelerators for parallel execution. But challenges remain with respect to partitioning a neural network model having a plurality of control dependency between operations for parallel execution on multiple accelerators while maintaining the control dependency.

SUMMARY OF THE DISCLOSURE

Embodiments of the present disclosure provide a method for adapting a computation graph of a machine learning model. The method can include partitioning the computation graph at an edge between a first node and a second node. Here, the edge can be a control dependency edge. The method can further include inserting a proxy node, a send node, and a receive node between the first node and the second node. The proxy node can be connected to the first node, the send node can be configured to receive output data from the proxy node, and the receive node can be configured to receive the output data from the send node.

Embodiments of the present disclosure also provide an apparatus for adapting a computation graph of a machine learning model. The apparatus can comprise a memory storing a set of instructions; and one or more processors configured to execute the set of instructions to cause the apparatus to perform: partitioning the computation graph at an edge between a first node and a second node. Here, the edge can be a control dependency edge. The one or more processors configured to execute the set of instructions to cause the apparatus to further perform inserting a proxy node, a send node, and a receive node between the first node and the second node. The proxy node can be connected to the first node, the send node can be configured to receive output data from the proxy node, and the receive node can be configured to receive the output data from the send node.

Embodiments of the present disclosure also provide a non-transitory computer readable medium that stores a set of instructions that is executable by at least one processor of a computing device to cause the computing device to perform a method for adapting a computation graph of a machine learning model. The method can include partitioning the computation graph at an edge between a first node and a second node. Here, the edge can be a control dependency edge. The method can further include inserting a proxy node, a send node, and a receive node between the first node and the second node. The proxy node can be connected to the first node, the send node can be configured to receive output data from the proxy node, and the receive node can be configured to receive the output data from the send node.

The computation graph can be partitioned to a first subgraph including the first node and a second subgraph including the second node by the partitioning. The first subgraph can be assigned to be executed on a first accelerator and the second subgraph can be assigned to be executed on a second accelerator. The proxy node and the send node can be inserted in the first subgraph and the receive node can be inserted in the second subgraph. The proxy node can be designed to be executed after the first node is executed or when an output of the first node satisfies a preset condition. The proxy node can represent a constant operation designed to produce a constant value as the output data. The second node can be designed to be executed after the receive node receives the output data from the send node.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In machine learning or deep learning, a neural network model may be graphically represented by a computational graph or a data structure comprising nodes and edges organized as a directed acyclic graph (DAG) that describes how data is processed or transformed during training or inference. Nodes represent variables, weights, or computation operations, while edges represent dependency between operations or data flow from one node to another node. A typical machine-learning or deep-learning model may have thousands or even millions of variables and computation operations. Model parallelism in which a neural network model is split into a plurality of sub-parts and each sub-part can be concurrently evaluated is important as the sizes of neural network models increase. In order to implement model parallelism, a computational graph of a neural network model can be partitioned into multiple subgraphs to execute them concurrently on different accelerators. A neural network model, however, is complicated and usually comprises a lot of control dependency edges in computational graph representation. Implementing control dependency of a neural network model usually requires a highly complicated data structure. Therefore, partitioning control dependency edges tends to cause errors in executing a neural network model and debugging thereof is difficult to achieve.

The disclosed embodiments provide efficient control dependency edge partitioning techniques to solve the issues mentioned above. The disclosed embodiments also provide a method and apparatus for adapting a computational graph, which reduces, minimizes, or removes errors in executing a neural network model on multiple accelerators while achieving model parallelism. The disclosed embodiments also provide a method and apparatus for adapting a computational graph, which can allow partitioning control dependency edges of a neural network model in an efficient way. The disclosed embodiments also provide a method and apparatus for improving inference performance by reducing, minimizing, or removing errors in executing a neural network model on multiple accelerators.

Figure 1A:
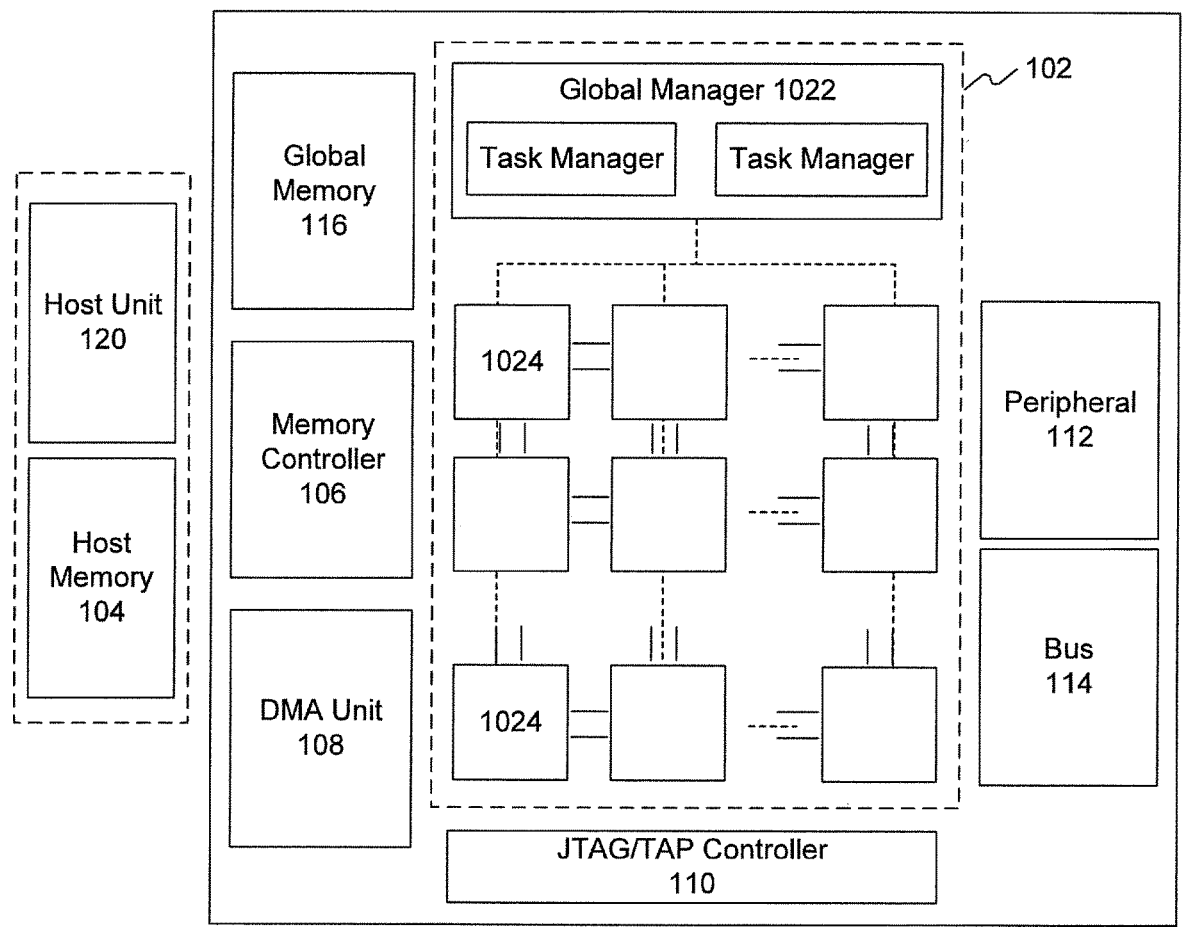
FIG. 1A illustrates an exemplary neural network accelerator architecture, consistent with embodiments of the present disclosure.

FIG. 1A illustrates an exemplary neural network accelerator architecture 100, consistent with embodiments of the present disclosure. In the context of this disclosure, a neural network accelerator may also be referred to as a machine learning accelerator or deep learning accelerator. In some embodiments, accelerator architecture 100 may be referred to as a neural network processing unit (NPU) architecture 100. As shown in FIG. 1A, accelerator architecture 100 can include an on-chip communication system 102, a host memory 104, a memory controller 106, a direct memory access (DMA) unit 108, a Joint Test Action Group (JTAG)/Test Access End (TAP) controller 110, a peripheral interface 112, a bus 114, a global memory 116, and the like. It is appreciated that, on-chip communication system 102 can perform algorithmic operations based on communicated data. Moreover, accelerator architecture 100 can include a global memory 116 having memory blocks (e.g., 4 blocks of 8 GB second generation of high bandwidth memory (HBM2)) to serve as main memory.

On-chip communication system 102 can include a global manager 1022 and a plurality of cores 1024. Global manager 1022 can include at least one task manager to coordinate with one or more cores 1024. Each task manager can be associated with an array of cores 1024 that provide synapse/neuron circuitry for the neural network. For example, the top layer of cores of FIG. 1A may provide circuitry for executing a first layer of a neural network, while the second layer of cores may provide circuitry for executing a second layer of the neural network. As shown in FIG. 1A, global manager 1022 can include two task managers to coordinate with two arrays of cores 1024.

Cores 1024 can include one or more processing elements that each includes single instruction, multiple data (SIMD) architecture including one or more processing units configured to perform one or more operations (e.g., multiplication, addition, multiply-accumulate, etc.) on the communicated data under the control of global manager 1022. To perform the operation on the communicated data packets, cores 1024 can include one or more processing elements for processing information in the data packets. Each processing element may comprise any number of processing units. In some embodiments, core 1024 can be considered a tile or the like.

Host memory 104 can be off-chip memory such as a host CPU's memory. For example, host memory 104 can be a double data rate synchronous dynamic random-access memory (e.g., DDR SDRAM) or the like. Host memory 104 can be configured to store a large amount of data with slower access speed, compared to the on-chip memory integrated within one or more processors, acting as a higher-level cache.

Memory controller 106 can manage reading and writing of data to and from a specific memory block (e.g., HBM2) within global memory 116. For example, memory controller 106 can manage read/write data coming from an external chip communication system 102 (e.g., from DMA unit 108 or a DMA unit corresponding with another accelerator) or from on-chip communication system 102 (e.g., from a local memory in core 1024 via a 2D mesh controlled by a task manager of global manager 1022). Moreover, while one memory controller is shown in FIG. 1A, it is appreciated that more than one memory controller can be provided in accelerator architecture 100. For example, there can be one memory controller for each memory block (e.g., HBM2) within global memory 116.

Memory controller 106 can generate memory addresses and initiate memory read or write cycles. Memory controller 106 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

DMA unit 108 can assist with transferring data between host memory 104 and global memory 116. In addition, DMA unit 108 can assist with transferring data between multiple accelerators. DMA unit 108 can allow off-chip devices to access both on-chip and off-chip memory without causing a host CPU interrupt. Thus, DMA unit 108 can also generate memory addresses and initiate memory read or write cycles. DMA unit 108 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that accelerator architecture 100 can include a second DMA unit, which can be used to transfer data between other accelerator architecture to allow multiple accelerator architectures to communicate directly without involving the host CPU.

JTAG/TAP controller 110 can specify a dedicated debug port implementing a serial communications interface (e.g., a JTAG interface) for low-overhead access to the accelerator without requiring direct external access to the system address and data buses. JTAG/TAP controller 110 can also have on-chip test access interface (e.g., a TAP interface) that implements a protocol to access a set of test registers that present chip logic levels and device capabilities of various parts.

Peripheral interface 112 (such as a PCIe interface), if present, serves as an and typically the) inter-chip bus, providing communication between the accelerator and other devices.

Bus 114 includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. Typically, if there is a peripheral interface 112 (e.g., the inter-chip bus), bus 114 is solely concerned with intra-chip buses, though in some implementations it could still be concerned with specialized inter-bus communications.

While accelerator architecture 100 of FIG. 1A is generally directed to an NPU architecture (as further described below), it is appreciated that the disclosed embodiments may be applied to any type of accelerator for accelerating some applications such as deep learning. It is also appreciated that the disclosed embodiments can be applied to any accelerator such as a chip with SIMD architecture. Such accelerators can be, for example, GPU (Graphics Processing Unit), FPGA (Field Programmable Gate Array), ASIC (Application Specific Integrated Circuit) with vector or matrix processing ability, or other types of neural network accelerators for deep learning. SIMD or vector architecture is commonly used to support computing devices with data parallelism, such as graphics processing and deep learning. The SIMD architecture can include multiple processing elements, wherein each of the processing elements can perform the same operation on multiple data points simultaneously.

Accelerator architecture 100 can also include a host unit 120. Host unit 120 can be one or more processing unit (e.g., an X86 central processing unit). In some embodiments, a host system having host unit 120 and host memory 104 can comprise a compiler (not shown). The compiler is a program or computer software that transforms computer codes written in one programming language into NPU instructions to create an executable program. In machine learning applications, a compiler can perform a variety of operations, for example, pre-processing, lexical analysis, parsing, semantic analysis, conversion of input programs to an intermediate representation, code optimization, and code generation, or combinations thereof.

In some embodiments, the compiler may be on the host system, which pushes one or more commands to on-chip communication system 102. Based on these commands, each task manager (e.g., task manager 102 of FIG. 1A) can assign any number of tasks to one or more cores (e.g., core 1024) or processing elements. Some of the commands may instruct a DMA unit (e.g., DMA unit 108 of FIG. 1A) to load instructions and data from host memory (e.g., host memory 104 of FIG. 1A) into a global memory. The loaded instructions may then be distributed to each core (e.g., core 1024 of FIG. 1A) assigned with the corresponding task, and the one or more cores may process these instructions.

It is appreciated that the first few instructions received by the core may instruct the core to load/store data from the global memory into one or more local memories of the core (e.g., a memory of the core or a local memory for each active core). Each core may then initiate the instruction pipeline, which involves fetching the instruction (e.g., via a fetch unit) from the local memory, decoding the instruction (e.g., via an instruction decoder) and generating local memory addresses (e.g., corresponding to an operand), reading the source data, executing or loading/storing operations, and then writing back results.

As shown in FIG. 1A, host unit 120 may be associated with host memory 104. In some embodiments, host memory 104 may be an integral memory or an external memory associated with host unit 120. Host memory 104 may be a local or a global memory. In some embodiments, host memory 104 may comprise host disk, which is an external memory configured to provide additional memory for host unit 120.

Figure 1B:
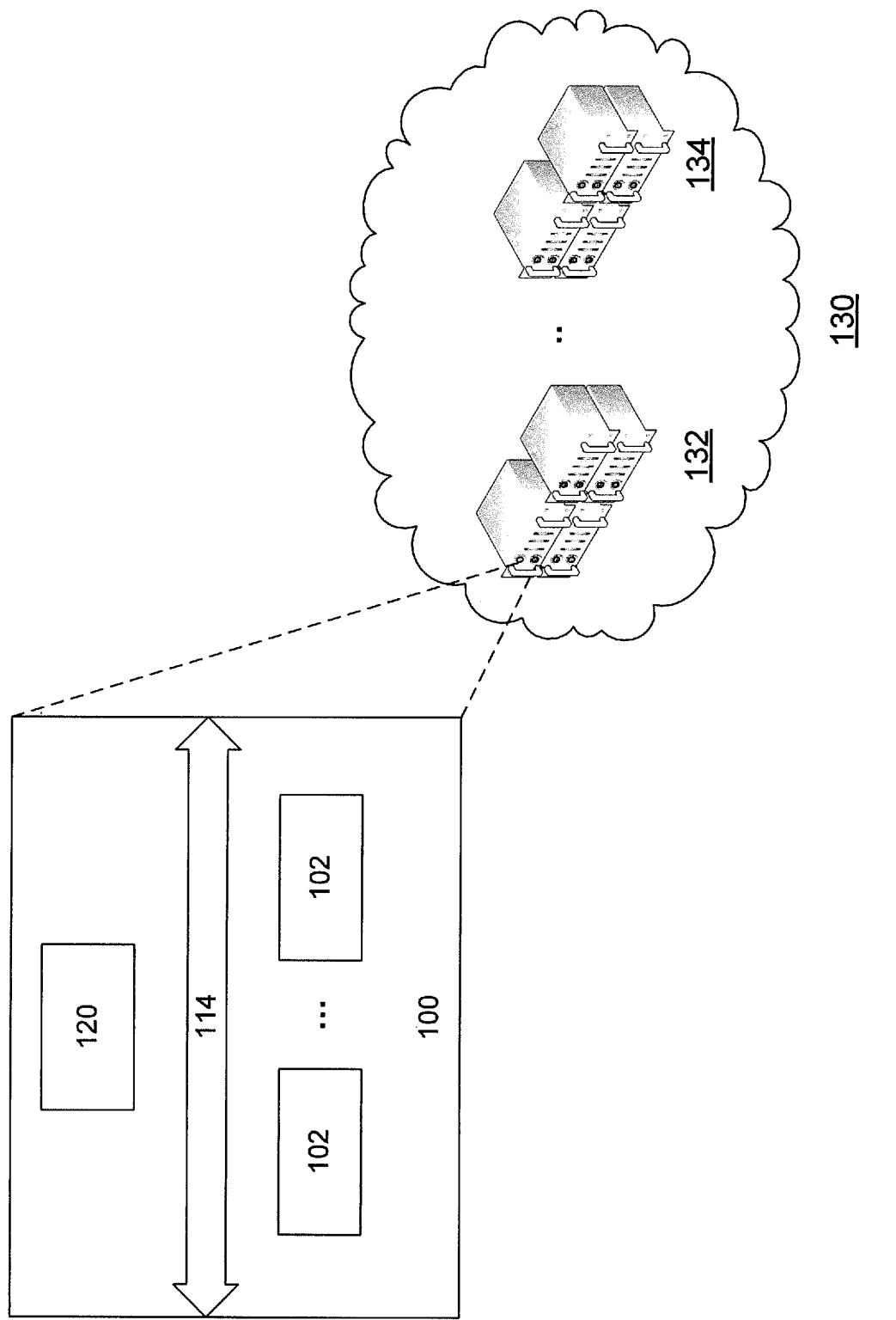
FIG. 1B illustrates a schematic diagram of an exemplary cloud system incorporating a neural network accelerator architecture, consistent with embodiments of the present disclosure.

FIG. 1B illustrates a schematic diagram of an exemplary cloud system incorporating a neural network accelerator architecture, consistent with embodiments of the present disclosure. As shown in FIG. 1B, cloud system 130 can provide cloud service with artificial intelligence (AI) capabilities and can include a plurality of computing servers (e.g., 132 and 134). In some embodiments, a computing server 132 can, for example, incorporate a neural network accelerator architecture 100 of FIG. 1A. Neural network accelerator architecture 100 is shown in FIG. 1B in a simplified manner for simplicity and clarity.

With the assistance of a neural network accelerator architecture 100, cloud system 130 can provide the extended AI capabilities of image recognition, facial recognition, translations, 3D modeling, and the like. It is appreciated that, neural network accelerator architecture 100 can be deployed to computing devices in other forms. For example, neural network accelerator architecture 100 can also be integrated in a computing device, such as a smart phone, a tablet, and a wearable device.

Figure 2:
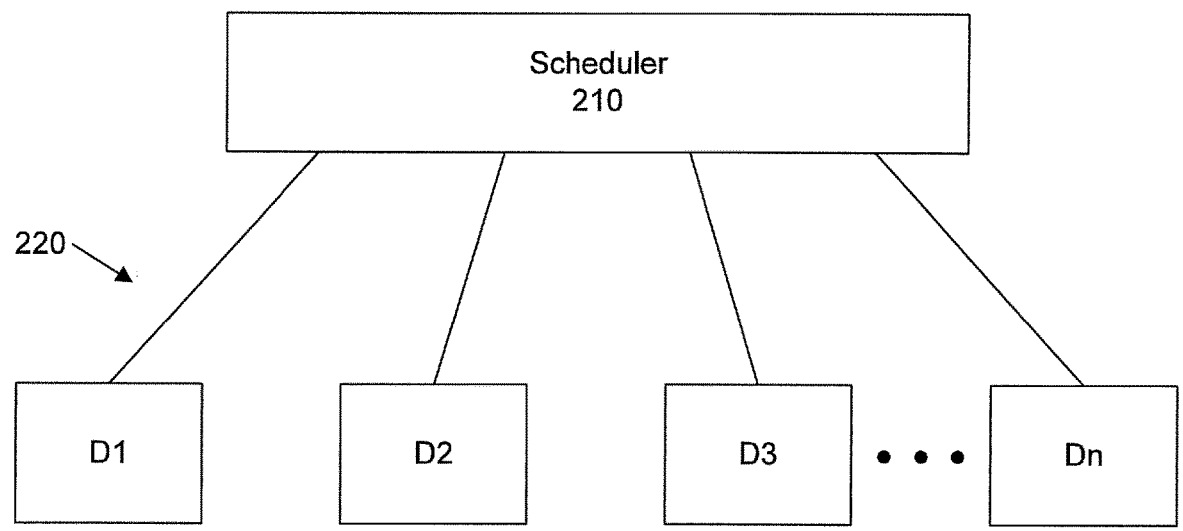
FIG. 2 illustrates an exemplary computing system having multiple computing resources, consistent with embodiments of the present disclosure.

FIG. 2 illustrates an exemplary computing system 200 having multiple computing resources, consistent with embodiments of the present disclosure. Computing system 200 includes a scheduler 210 and computing resources 220. In some embodiments, the computing resources 220 may include a plurality of target devices D1 to Dn. In some embodiments, the computing resources 220 may include a plurality of target devices D1 to Dn that may not have equal processing performance. In some embodiments, the computing resources 220 may include one target device in which processing elements do not have equal processing performance. Scheduler 210 is configured to schedule tasks with respect to execution order of operations and which operation is processed in which target device or which operation is processed in which processing element. In some embodiments of the present disclosure, scheduler 210 may be any form including, but not limited to, executable instructions stored in a computer readable medium for use by or in connection with a computing device including one or more processors. In some embodiments, scheduler 210 may be implemented as logic or circuitry configured to perform operations of the executable instructions. In some embodiments, scheduler 210 may be implemented within a compiler. In some embodiments, scheduler 210 may be implemented in runtime libraries.

In some embodiments, target devices D1 to Dn can be implemented as any one of CPU, GPU, FPGA. ASIC, etc. In some embodiments, at least two of the plurality of target devices D1 to Dn may have different processing speeds, power consumptions, transfer costs, etc. In some embodiments, a certain target device may be configured to be specialized to process a certain operation with high performance such as low cost and high accuracy. In some embodiments, the target devices D1 to Dn can be accelerators having, for example, the accelerator architecture 100 of FIG. 1A.

Execution performance of a computing system 200, for example, shown in FIG. 2 can be improved by identifying optimal target devices for executing corresponding operations as well as by optimizing an execution order of operations. In some embodiments of the present disclosure, scheduler 210 is configured to provide optimized mapping between tasks of a computation graph and target devices included in computing resources 220. In some embodiments, the optimal mapping may include processing element mapping for executing the operations in one target device. In order to perform a parallel execution of a neural network model on multiple target devices D1 to Dn in a computing system 200, a neural network model can be partitioned and mapped onto multiple target devices D1 to Dn. However, a neural network model includes control dependency edges and partitioning control dependency edges tends to cause errors in executing a neural network model and debugging thereof is difficult to achieve.

Figure 3:
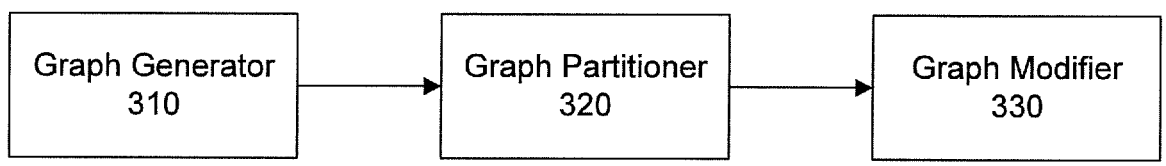
FIG. 3 illustrates a block diagram of exemplary components of an apparatus for adapting a computation graph, consistent with embodiments of the present disclosure.

FIG. 3 illustrates a block diagram of exemplary components of an apparatus for adapting a computation graph, consistent with embodiments of the present disclosure. It is appreciated that in various embodiments computation graph adapting apparatus 300 may be part of or may be separate from a scheduler (e.g., scheduler 210 of FIG. 2) or a compiler. As shown in FIG. 3, computation graph adapting apparatus 300 can include a graph generator 310, a graph partitioner 320, and a graph modifier 330.

Graph generator 310 can compile a source code for a machine-learning model or neural network model to generate a computation graph representing the source code. In some embodiments, graph generator 310 may transform a machine-learning model or neural network model written in high level language to generate a computation graph representing the machine-learning model or neural network model. In some embodiments, the computation graph can be generated from another high-level code initially compiled from the source code. In some embodiments, the machine-learning model may be a trained frozen machine-learning model. In some embodiments, the graph generator 310 can generate a computation graph in a form of a Directed Acyclic Graph (DAG) by parsing a machine-learning model. In computation graphs, nodes represent variables, weights, or computation operations, while edges represent dependency between nodes or data or tensor flow from one node to another. A node representing a computation operation can consume input data flowing in along an incoming edge to the node, while output data produced by the computation operation can flow out along an outgoing edge from the node.

Figure 4:
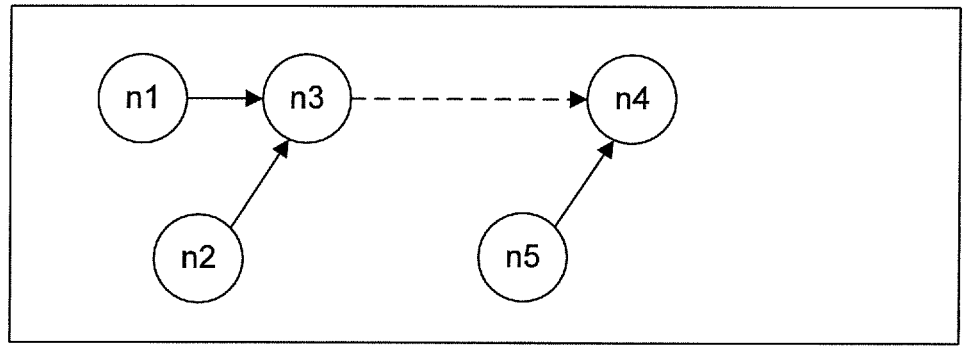
FIG. 4 illustrates an example for graph partition and graph modification, consistent with embodiments of the present disclosure.
Figure 4:
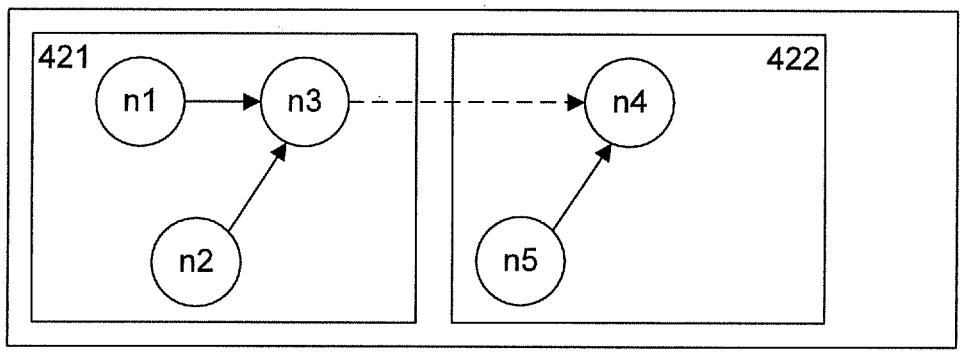
Figure 4:
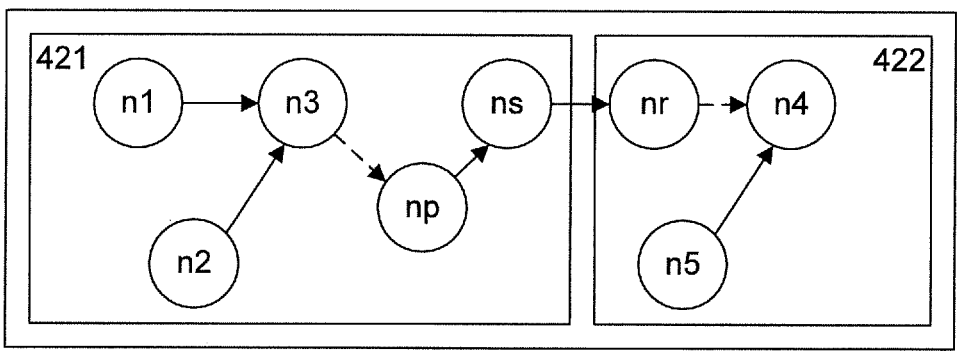

An example of a computation graph generated by graph generator 310 is illustrated as state 410 in FIG. 4. As shown at state 410, a computation graph includes a plurality of nodes n1 to n5 and edges connecting two nodes among the plurality of nodes n1 to n5. It is appreciated that any number of nodes and edges can be included in a computation graph according to embodiments of the present disclosure. In some embodiments, some nodes n1 to n5 can include information such as a type of operation, dimensions of data structure, input node(s), output node(s), etc. Here, the operation may include a convolution (Cony), ReLU, multiplication (MatrixMul), etc. In some embodiments, some other nodes n1 to n5 may be non-operational nodes and can include weights and other parameters such as constants.

As stated above, an edge in a computation graph can represent a dependency between two nodes connected by the corresponding edge. These dependencies can include data dependencies or control dependencies. In FIG. 4, data dependencies can show the flow of data or tensors between two nodes and can be shown as solid arrows, while control dependencies can use dotted lines. At state 410 in FIG. 4, edges between nodes n1 and n3, between nodes n2 and n3, and between nodes n4 and n5 represent data dependency edges and an edge between nodes n3 and n4 represents a control dependency edge. For a data dependency edge, a node at the end point of the edge can be processed only after a node at the start point of the edge is processed and result data thereof is transferred to the node at the end point of the edge. For example, node n3 can be processed only after node n1 and node n2 are processed and the outputs of the nodes n1 and n2 are provided to the node n3.

For a control dependency edge, a processing result of a node at the start point of the edge can determine whether a node at the end point of the edge should be processed or not. In some embodiments, node n4 can be processed only after node n3 is processed and the output thereof meets a certain condition while output data of node n3 does not need to be provided to node n4. For example, it may be designed to process node n4 only when the outcome of processing node n3 is larger than a pre-set value. It is appreciated that any kind of conditions can be used to determine whether node n4 should be processed or not. That is, it can be designed that processing of node n4 depends on the output result of node n3. Such control dependency edges can occur to represent, for example, control statements or conditional statements (e.g., "for loop," "while loop," "if-then-else," etc.) in source code. For example, the output result of node n3 may represent an iteration number for a loop of operations and node n4 can be designed to be executed only when the iteration number is larger than a preset value. According to embodiments of the present disclosure, it can be designed that node n4 is processed only after node n3 is processed regardless of the outcome of node n3. This kind of control dependency can occur, for example, when node n4 receives global data (not shown), which is updated depending on the process of node n3 or the outcome result of node n3.

Referring back to FIG. 3, graph partitioner 320 is configured to partition a computation graph into a plurality of subgraphs, consistent with embodiments of the present disclosure. In some embodiments, graph partitioner 320 can be configured to map the plurality of subgraphs onto multiple accelerators (e.g., target devices D1 to Dn in FIG. 2). In some embodiments, the computation graph to be divided by the graph partitioner 320 can be fed by the graph generator 310. In some embodiments, the computation graph to be divided by the graph partitioner 320 can be a computation graph to which optimization techniques such as layer fusions, node clustering, etc. to maximize inference performance on accelerators have been applied. Referring back to FIG. 4, an example of the computation graph divided by the graph partitioner 320 is illustrated at state 420. In this example, the graph partitioner 320 divides the computation graph of state 410.

At state 420, it is shown that the computation graph is divided into two subgraphs 421 and 422, which are mapped to be executed on two different accelerators such as target devices D1 and D2. While FIG. 4 illustrates only two subgraphs at state 420, it is appreciated that a partitioning process can be performed to divide the computation graph into any number of subgraphs based on available accelerators. According to embodiments of the present disclosure, graph partitioner 320 may consider the total number of nodes in a computation graph, the available accelerators, the computing resources available in each of the available accelerators, the execution specialty, if any, of each of the available accelerators, etc. when partitioning or mapping the computation graph. In some embodiments, the partitioning process can be performed recursively until each of the subgraphs includes an appropriate number of nodes and edges. In some embodiments, the appropriate number of nodes and edges for a subgraph can be determined based on available accelerators, each accelerator's capacity, time requirements, properties of a data structure, and so on.

In some embodiments, graph partitioner 320 can partition a computation graph into multiple subgraphs that are executed on different accelerators based on the subgraph profiling information to optimize performance in executing the computation graph. For example, a computation graph may include subgraphs that are commonly used in many machine learning models as their components. For example, the commonly used subgraphs can include MobileNets layers, ResNet layers, Region Proposal Network, etc. In some embodiments, prior history of execution, experiments, or simulations of a certain subgraph on accelerators can identify which accelerator is optimal for processing the certain subgraph. In some embodiments, each subgraph can be assigned to a certain accelerator that can optimize performance of executing the subgraph.

In some embodiments, graph partitioner 320 may take account of information including: 1) system and accelerator information, 2) operation profiling information per accelerator, and 3) subgraph profiling information per accelerator. The system information may include interconnect bandwidth information between accelerators or between a host unit and an accelerator. The accelerator information may include computing throughput information and memory bandwidth. The operation profiling information may include execution time or speed information and delay information of an accelerator for executing a certain operation such as a convolution, matrix multiplication, etc. The operation profiling information can be estimated by simulations or obtained by previous experiments on each of accelerators. In some embodiments, operation profiling information for each of the accelerators can be stored for each of operations. The subgraph profiling information may include execution time or speed information and delay information for executing the subgraph on each accelerator. The subgraph profiling information can be estimated by simulations or obtained by previous experiments on each of accelerators. In some embodiments, subgraph profiling information for each of the accelerators can be stored for each of subgraphs. Such information may be stored in database, which can be implemented as a part of apparatus 300, or which can be implemented separately from the apparatus 300 and can communicate with the apparatus 300 via a wired or wireless network.

When partitioning a computation graph, graph partitioner 320 may consider properties of a computation graph. As illustrated at state 420, it is observed that there are single edges in a computation graph, each of which connecting two nodes. In some embodiments, partitioning a computation graph at such single edges may reduce complexity in pipelining execution of subgraphs. In some embodiments, graph partitioning techniques such as minimum cut algorithm can be used to cut the computation graph into subgraphs by graph partitioner 320.

FIG. 4 illustrates, as an example, that a first subgraph 421 and a second subgraph 422 are partitioned at a control dependency edge between two nodes n3 and n4 at state 420. In some embodiments, a first subgraph 421 and a second subgraph 422 can be mapped to different accelerators such as accelerators D1 and D2, respectively. A control dependency edge between nodes n3 and n4 is disconnected by the partition and the first subgraph 421 and the second subgraph 422 can be executed in parallel on different accelerators D1 and D2. Therefore, it is possible that node n4 is executed without waiting for the execution of node n3 or regardless of the outcome of node n3, which causes errors in execution of the computation graph and makes it difficult to debug.

Referring back to FIG. 3, graph modifier 330 can be configured to modify a computation graph, consistent with embodiments of the present disclosure. According to embodiments of the present disclosure, graph modifier 330 can be configured to add a proxy node np, a send node ns, and a receive node nr between the two nodes n3 and n4, between which a control dependency edge is disconnected by partition. In some embodiments, a proxy node np and a send node ns can be inserted after node n3 at the start point of the partitioned control dependency edge and a receive node nr can be inserted in front of a node n4 at the end point of the partitioned control dependency edge. A proxy node np and a send node ns can be inserted in the first subgraph 421 within which anode n3 is positioned and a receive node nr can be inserted in the second subgraph 422 within which a node n4 is positioned according to embodiments of the present disclosure.

In some embodiments, a proxy node np is connected by a control dependency edge to a node n3. Here, the control dependency edge between the proxy node np and the node n3 may have the same control dependency with the original control dependency edge between the nodes n3 and n4. Therefore, when processing of node n3 is completed or the outcome of node n3 meets a preset condition, a proxy node np can be executed. Output data of node n3 does not need to be provided to the proxy node np. A proxy node np can be implemented as, but not limited to, a constant operation, consistent with embodiments of the present disclosure. In some embodiments, a proxy node np (e.g., representing a constant operation) can be designed to be processed when the processing of node n3 is completed or the outcome of node n3 meets a present condition. For example, a proxy node np can produce a constant value as its output and the output data of the proxy node np is transferred to a send node ns. While a constant operation is explained as an example for a proxy node np, it will be appreciated that any operation can be used to produce output to be transferred to the send node ns, consistent with embodiments of the present disclosure. In some embodiments, a send node ns is designed to send the received data to a receive node nr to be executed in a different accelerator such as D2.

On a second subgraph 422 side, a receive node nr is designed to receive the sent data from the send node ns that is executed on a different accelerator such as D1. The node n4 can be designed to be executed after a receive node nr receives data from the send node ns. Execution of the node n4 depends on whether the receive node nr receives data from the send node ns or not. In this example, a constant value generated from a proxy node np is transferred from the proxy node np to a receive node nr through a send node ns. In some embodiments, there is no data transfer between a node n3 and a proxy node np and between a receive node nr and a node n4 in that it is not intended to transfer data from a node n3 to a node n4 in an original computation graph. The edges between a node n3 and a proxy node np and between a receive node nr and a node n4 are control dependency nodes and are shown as dotted lines at state 430 in FIG. 4.

When executing the computation graph on accelerators, with assistance of DMA units (e.g., DMA unit 108 of FIG. 1A) of a first accelerator D1 and a second accelerator D2, the data from a send node ns can be transferred to or accessible by the second accelerator with/without a host CPU interruption. Processing elements or cores in the second accelerator D2, which are assigned to execute the receive node nr, can be instructed to wait for an instruction to initiate execution of the receive node nr. The instruction to initiate the execution of the receive node nr can be provided to or be accessible by the corresponding processing elements or cores when the output data from the send node ns is transferred to or accessible by the second accelerator or by the processing elements or cores for executing the receive node nr. In some embodiments, the instruction to initiate the execution of the receive node nr can be generated by a host CPU and can be distributed to the second accelerator. In some embodiments, the instruction to initiate the execution of the receive node nr can be generated by the second accelerator when the output data from the send node ns is received or accessible by the second accelerator.

While partitioning a computation graph including one control dependency edge into two subgraphs has been explained with respect to FIG. 4, it is appreciated that embodiments of the present disclosure can be applied to scenarios involving two or more control dependency edges and three or more subgraphs are generated.

Figure 5:
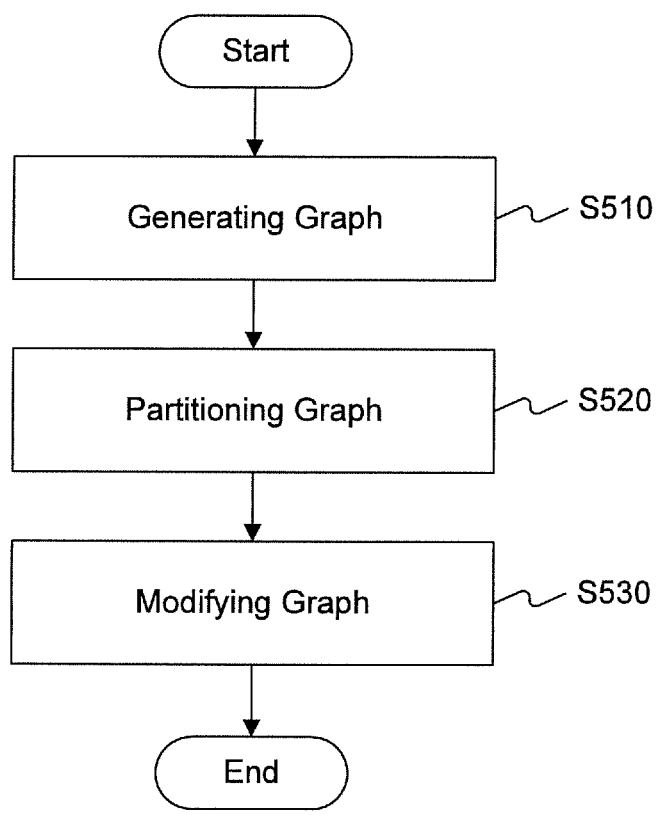
FIG. 5 illustrates an exemplary flow diagram for adapting a computation graph, consistent with embodiments of the present disclosure.

FIG. 5 illustrates an exemplary flow diagram for adapting a computation graph, consistent with embodiments of the present disclosure. For illustrative purposes, a method for adapting a computation graph will be described together with a computation graph adapting apparatus 300 of FIG. 3 and a computation graph of FIG. 4.

At step S510, a computation graph representing a source code for a machine-learning model or neural network model is generated. Step S510 can be performed by, for example, graph generator 310, among others. As shown in state 410, the generated computation graph may include a plurality of nodes and edges and be in a form of a Directed Acyclic Graph (DAG).

Edge in a computation graph can represent a dependency between two nodes connected by the corresponding edge. These dependencies can include data dependencies or control dependencies. In FIG. 4, aata dependencies can show the flow of data or tensors between two nodes and can be shown as solid arrows, while control dependencies can use dotted lines. At state 410 in FIG. 4, edges between nodes n1 and n3, between nodes n2 and n3, and between nodes n4 and n5 represent data dependency edges and an edge between nodes n3 and n4 represents a control dependency edge. For a data dependency edge, a node at the end point of the edge can be processed only after a node at the start point of the edge is processed and result data thereof is transferred to the node at the end point of the edge.

For a control dependency edge, a processing result of a node at the start point of the edge can determine whether a node at the end point of the edge should be processed or not. In some embodiments, node n4 can be processed only after node n3 is processed and the output thereof meets a certain condition while output data of node n3 does not need to be provided to node n4. It can be designed that processing of node n4 depends on the output result of node n3. Such control dependency edges can occur to represent, for example, control statements or conditional statements (e.g., "for loop," "while loop," "if-then-else," etc.) in source code. According to embodiments of the present disclosure, it can be designed that node n4 is processed only after node n3 is processed regardless of the outcome of node 3.

At step S520, a computation graph can be partitioned into plurality of subgraphs, consistent with embodiments of the present disclosure. Step S520 can be performed by, for example, graph partitioner 320, among others. In some embodiments, the plurality of subgraphs can be mapped onto multiple accelerators (e.g., target devices D1 to Dn in FIG. 2). An example of the partitioned computation graph is illustrated at state 420 in FIG. 4. While FIG. 4 illustrates only two subgraphs at state 420, it is appreciated that a partitioning process can be performed to divide the computation graph into any number of subgraphs based on available accelerators. According to embodiments of the present disclosure, the total number of nodes in a computation graph, the available accelerators, the computing resources available in each of the available accelerators, the execution specialty, if any, of each of the available accelerators, among other things can be considered when partitioning or mapping the computation graph.

When partitioning a computation graph, properties of a computation graph can be considered. As illustrated at state 420, it is observed that there are single edges in a computation graph, each of which connecting two nodes. In some embodiments, partitioning a computation graph at such single edges may reduce complexity in pipelining execution of subgraphs. In some embodiments, graph partitioning techniques such as minimum cut algorithm can be used to cut the computation graph into subgraphs.

FIG. 4 illustrates, as an example, that a first subgraph 421 and a second subgraph 422 are partitioned at a control dependency edge between two nodes n3 and n4 at state 420. In some embodiments, a first subgraph 421 and a second subgraph 422 can be mapped to different accelerators such as accelerators D1 and D2, respectively. A control dependency edge between nodes n3 and n4 is disconnected by the partition and the first subgraph 421 and the second subgraph 422 can be executed in parallel on different accelerators D1 and D2. Therefore, it is possible that node n4 is executed without waiting for the execution of node n3 or regardless of the outcome of node n3, which causes errors in execution of the computation graph and makes difficult to debug.

Referring back to FIG. 5, at step S530, a computation graph can be modified to insert additional nodes, consistent with embodiments of the present disclosure. Step S530 can be performed by, for example, graph modifier 330, among others. According to embodiments of the present disclosure, a proxy node np, a send node ns, and a receive node nr can be inserted between the two nodes n3 and n4, between which a control dependency edge is disconnected by partition. In some embodiments, a proxy node np and a send node ns can be inserted after node n3 at the start point of the partitioned control dependency edge and a receive node nr can be inserted in front of a node n4 at the end point of the partitioned control dependency edge. A proxy node np and a send node ns can be inserted in the first subgraph 421 within which a node n3 is positioned and a receive node nr can be inserted in the second subgraph 422 within which a node n4 is positioned according to embodiments of the present disclosure.

In some embodiments, a proxy node np is connected by a control dependency edge to a node n3. Here, the control dependency edge between the proxy node np and the node n3 may have the same control dependency with the original control dependency edge between the nodes n3 and n4. Therefore, when processing of node n3 is completed or the outcome of node n3 meets a preset condition, a proxy node np can be executed. Output data of node n3 does not need to be provided to the proxy node np. A proxy node np can be implemented as, but not limited to, a constant operation, consistent with embodiments of the present disclosure. In some embodiments, a proxy node np (e.g., representing a constant operation) can be designed to be processed when the processing of node n3 is completed or the outcome of node n3 meets a present condition. For example, a proxy node np can produce a constant value as its output and the output data of the proxy node np is transferred to a send node ns. While a constant operation is explained as an example for a proxy node np, it will be appreciated that any operations can be used to produce output to be transferred to the send node ns, consistent with embodiments of the present disclosure. In some embodiments, a send node ns is designed to send the received data to a receive node nr to be executed in a different accelerator such as D2.

On a second subgraph 422 side, a receive node nr is designed to receive the sent data from the send node ns that is executed on a different accelerator such as D1. The node n4 can be designed to be executed after a receive node nr receives data from the send node ns. Execution of the node n4 depends on whether the receive node nr receives data from the send node ns or not. In this example, a constant value generated from a proxy node np is transferred from the proxy node np to a receive node nr through a send node ns. In some embodiments, there is no data transfer between a node n3 and a proxy node np and between a receive node nr and a node n4 in that it is not intended to transfer data from a node n3 to a node n4 in an original computation graph. The edges between a node n3 and a proxy node np and between a receive node nr and a node n4 are control dependency nodes and are shown as dotted lines at state 430 in FIG. 4.

Embodiments herein include database systems, methods, and tangible non-transitory computer-readable media. The methods may be executed, for example, by at least one processor that receives instructions from a tangible non-transitory computer-readable storage medium. Similarly, systems consistent with the present disclosure may include at least one processor and memory, and the memory may be a tangible non-transitory computer-readable storage medium. As used herein, a tangible non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, registers, caches, and any other known physical storage medium. Singular terms, such as "memory" and "computer-readable storage medium," may additionally refer to multiple structures, such a plurality of memories or computer-readable storage media. As referred to herein, a "memory" may comprise any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage media may be utilized in implementing a computer-implemented method. The term "computer-readable storage medium" should be understood to include tangible items and exclude carrier waves and transient signals.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method for adapting a computation graph of a machine learning model, comprising:
    partitioning the computation graph into a first subgraph and a second subgraph at an edge between a first node and a second node, wherein the edge is a control dependency edge;
    inserting a proxy node, a send node, and a receive node between the first node and the second node, wherein the proxy node is connected to the first node, the send node is configured to receive output data from the proxy node, and the receive node is configured to receive the output data from the send node, wherein the proxy node and the second node are included in the first subgraph and the receive node is included in the second subgraph; and
    executing the first subgraph on a first accelerator and the second subgraph on a second accelerator, wherein the first accelerator is configured to execute the proxy node after executing the first node and to transfer the output data of the proxy node to the send node, and the second accelerator is configured to initiate execution of the receive node when the output data from the send node is transferred to or accessible by the second accelerator.

2. The method of claim 1, wherein the proxy node is designed to be executed after the first node is executed or when an output of the first node satisfies a preset condition.

3. The method of claim 1, wherein the proxy node represents a constant operation designed to produce a constant value as the output data.

4. The method of claim 1, wherein the second node is designed to be executed after the receive node receives the output data from the send node.

5. An apparatus for adapting a computation graph of a machine learning model, comprising:
    a memory storing a set of instructions; and
    one or more processors configured to execute the set of instructions to cause the apparatus to perform:
        partitioning the computation graph into a first subgraph and a second subgraph at an edge between a first node and a second node, wherein the edge is a control dependency edge;
        inserting a proxy node, a send node, and a receive node between the first node and the second node, wherein the proxy node is connected to the first node, the send node is configured to receive output data from the proxy node, and the receive node is configured to receive the output data from the send node, wherein the proxy node and the second node are included in the first subgraph and the receive node is included in the second subgraph; and executing the first subgraph on a first accelerator and the second subgraph on a second accelerator, wherein the first accelerator is configured to execute the proxy node after executing the first node and to transfer the output data of the proxy node to the send node, and the second accelerator is configured to initiate execution of the receive node when the output data from the send node is transferred to or accessible by the second accelerator.

6. The apparatus of claim 5, wherein the proxy node is designed to be executed after the first node is executed or when an output of the first node satisfies a preset condition.

7. The apparatus of claim 5, wherein the proxy node represents a constant operation designed to produce a constant value as the output data.

8. The apparatus of claim 5, wherein the second node is designed to be executed after the receive node receives the output data from the send node.

9. A non-transitory computer readable medium that stores a set of instructions that is executable by at least one processor of a computing device to cause the computing device to perform a method for adapting a computation graph of a machine learning model, the method comprising:

partitioning the computation graph into a first subgraph and a second subgraph at an edge between a first node and a second node, wherein the edge is a control dependency edge;

inserting a proxy node, a send node, and a receive node between the first node and the second node, wherein the proxy node is connected to the first node, the send node is configured to receive output data from the proxy node, and the receive node is configured to receive the output data from the send node, wherein the proxy node and the second node are included in the first subgraph and the receive node is included in the second subgraph; and executing the first subgraph on a first accelerator and the second subgraph on a second accelerator, wherein the first accelerator is configured to execute the proxy node after executing the first node and to transfer the output data of the proxy node to the send node, and the second accelerator is configured to initiate execution of the receive node when the output data from the send node is transferred to or accessible by the second accelerator.

10. The computer readable medium of claim 9, wherein the proxy node is designed to be executed after the first node is executed or when an output of the first node satisfies a preset condition.

11. The computer readable medium of claim 9, wherein the proxy node represents a constant operation designed to produce a constant value as the output data.

12. The computer readable medium of claim 9, wherein the second node is designed to be executed after the receive node receives the output data from the send node.

* * * * *